United States Patent [19]

Cohr

[11] Patent Number: 4,932,953

[45] Date of Patent: Jun. 12, 1990

[54] APPLICATOR TOOL

[75] Inventor: Lindsay W. J. Cohr, Palmerston North, New Zealand

[73] Assignee: Allflex New Zealand Limited, Palmerston North, New Zealand

[21] Appl. No.: 287,900

[22] Filed: Dec. 21, 1988

[30] Foreign Application Priority Data

Dec. 23, 1987 [NZ] New Zealand .................. 223074

[51] Int. Cl.⁵ .............................................. A61B 17/00
[52] U.S. Cl. ................................................. 606/117
[58] Field of Search ............... 128/330; 606/116, 117; 227/67

[56] References Cited

U.S. PATENT DOCUMENTS 4,787,384 11/1988 Campbell et al. .................... 128/330

FOREIGN PATENT DOCUMENTS 0138570 4/1985 European Pat. Off. ............ 128/330
0216630 4/1987 European Pat. Off. ............ 128/330
2055670 3/1981 United Kingdom ................ 128/330

Primary Examiner—Michael H. Thaler
Attorney, Agent, or Firm—Blakely, Sokoloff Taylor & Zafman

[57] ABSTRACT

An applicator tool for applying identification tags to animals having a movable applicator member which is lever controllable. A magazine into which a plurality of tags can be individually loaded is mounted on the applicator such that it can be indexed to place a tag located therein into a position whereby the applicator member can engage, during operation of the applicator tool, with a part of the tag. That part of the tag can then be moved through an opening in the portion of the animal to which the tag is to be applied such that the tag becomes installed in that portion of the animal.

9 Claims, 4 Drawing Sheets

APPLICATOR TOOL

This invention relates to an applicator tool for the applying of an identification tag to an animal and more particularly an ear tag to the ear of an animal.

Animal ear tags can be classified into a number of categories. For example there are tags formed of two components which can be applied to an animal's ear by a pliers type applicator tool the tag being retained in the animal's ear by the interlocking or snap-lock action of the two components. There are also one-piece tags which either loop through an opening of the animal's ear, eg the Allflex FLOCK tag or Leader sheep tag or are retained in the animal's ear by a head portion which acts as an anchor. With the first mentioned tags the material used is rigid/semi-rigid while normally with the headed tags the material is flexible.

Some one piece tags have been traditionally applied in a two shot operation by using a punching tool which punches an opening in the animal's ear following which the tag is manually installed through the thus formed opening. There have, however, been developed applicator tools which can apply a tag in a one-shot operation wherein the opening is formed and in the same operation the tag is installed in the animal's ear. One example of such a one-shot applicator is described and claimed in European Patent Specification Ser. No. 0216630 in the name of Ben Whangaparita.

With such applicators the user has to manually load each tag into the applicator before each tagging operation. This can be tedious and time consuming especially when a large number of animals have to be tagged at the same time. Such a situation is common with sheep where a large flock of sheep must be tagged during one tagging operation.

In an attempt to overcome the need to individually load such tags prior to application an applicator has been developed whereby a plurality of tags can be installed into the body of the applicator such that the operator by "cocking" the applicator between each individual tagging operation can ensure a tag is positioned ready for tagging. This overcomes the need to individually load each tag prior to tagging, however, the applicator has proved not to be successful primarily because of factors of bulkiness and unreliability. Such an applicator is sold under the RACEMASTER trade mark and is described in British patent specification Ser. No. 2055670.

The aim of the present invention is to provide an applicator tool in which a plurality of tags can be loaded prior to tagging thereby obviating the need to load individual tags prior to each individual tagging operation the applicator being reliable in use and not excessively bulky and difficult to use.

Broadly in one aspect of the invention there is provided an applicator tool for applying identification tags to animals the applicator tool comprising a movable applicator member which is lever controllable, a magazine into which a plurality of tags can be individually loaded, said magazine being mounted on the applicator such that it can be indexed to place a tag located therein into a position whereby the applicator member can engage, during operation of the applicator tool, with the part of said tag and thereby enable that part of the tag to be moved through an opening in the portion of the animal to which the tag is to be applied such that the tag becomes installed in that portion of the animal.

Preferably the applicator member is movable such that it forms said opening and then engages with the tag part so that the tag part during relative movement between the applicator member and the animal can be caused to move through the opening as the applicator member is retracted from the opening.

Preferably the magazine is generally cylindrical and is mounted for rotation about a central axis of symmetry. A plurality of cavities are located at or near the periphery of the magazine said cavities being suitably shaped to accommodate at least part of a tag.

The essential component of the applicator tool according to the invention is the magazine which can be indexed to place one of a plurality of tags located in the magazine in a position such that a the applicator member is moved during operation of the applicator tool a part of the tag is engagable by the applicator member. The magazine can be so positioned that the applicator member engaged with an forces into or through that part of the animal to which the tag is to be applied (hereinafter for convenience referred to as the "ear" of the animal) the tag part, or as more preferred, forms an opening then engages with the tag part such that relative movement between the applicator and the ear causes the tag to be drawn through the opening in the animal's ear as the applicator member is retracted from the opening.

In order to provide a more detailed description of the present invention reference will be made to an applicator of the second type wherein the opening is formed prior to the tag part being engaged. To this end reference will be made to the accompanying drawings in which:-

Figure 1:
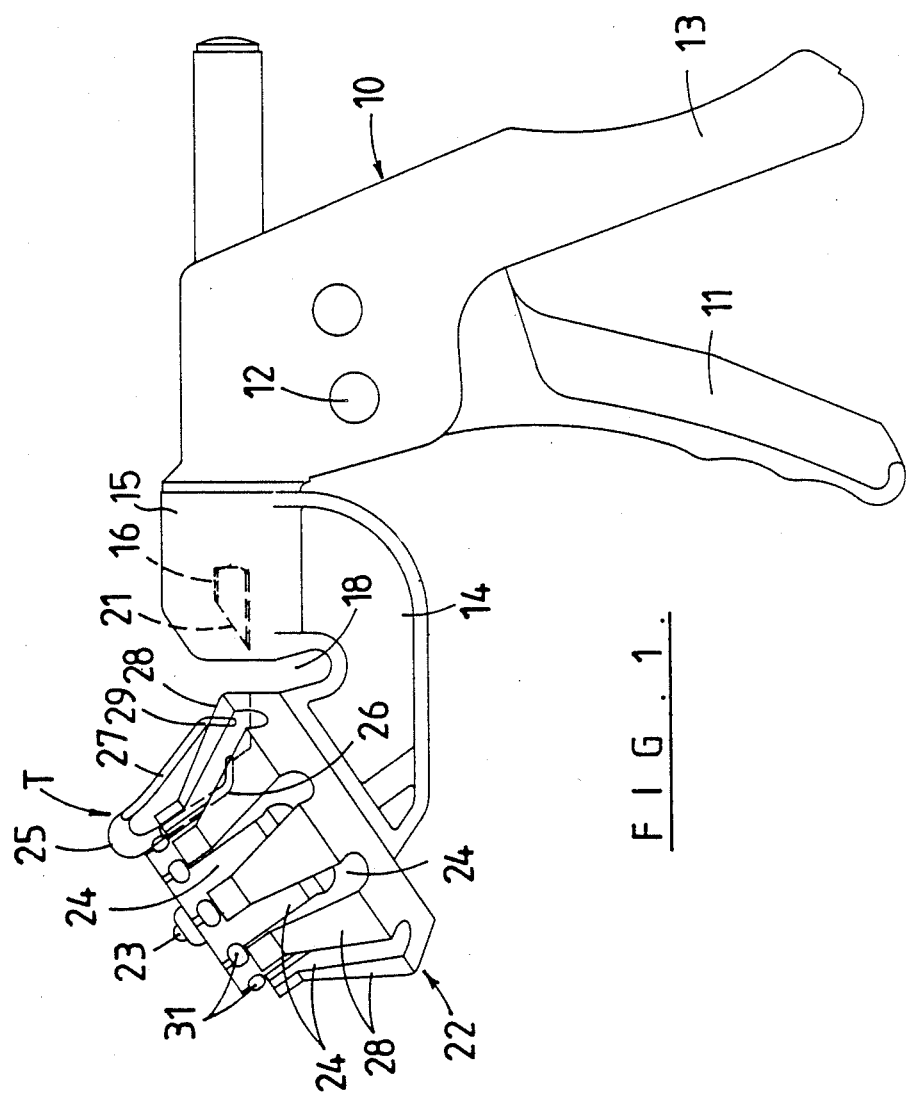
FIG. 1 is a side view of the applicator tool according to the invention.
Figure 2:
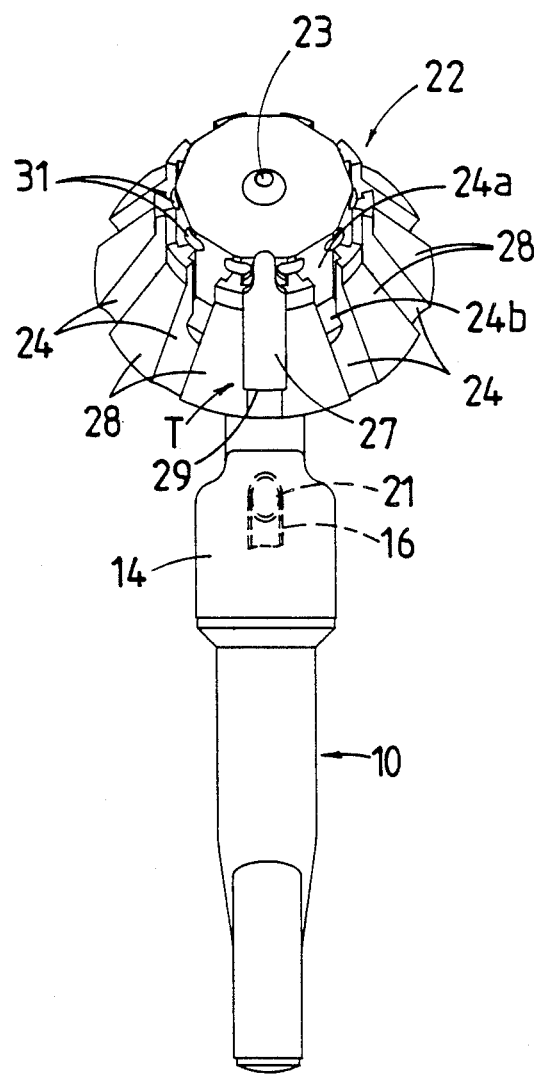
FIG. 2 is a top plan view.
Figure 4:
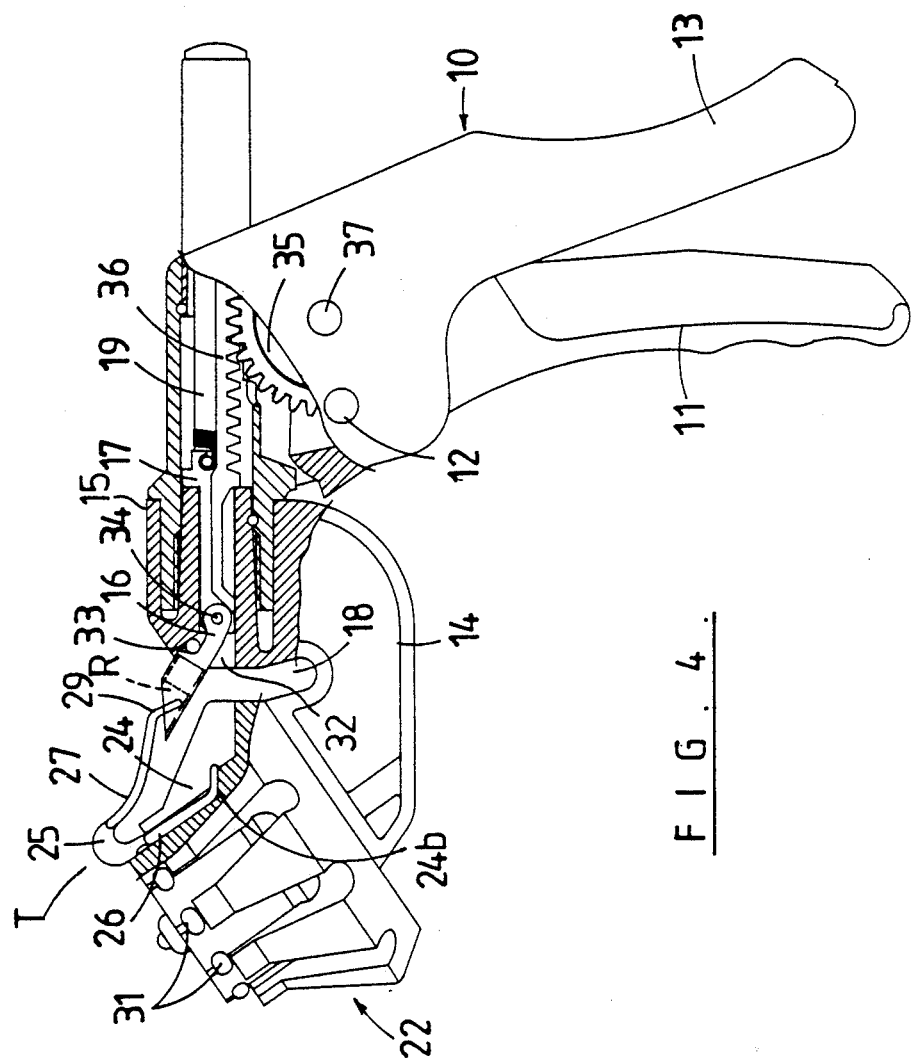
FIG. 4 is a partially sectioned view of the applicator tool as shown in FIG. 1 but with the applicator "closed" i.e. with the tag engaged with the applicator member.

For convenience and for the purposes of illustration of the present invention the following description and the aforementioned drawings relate to the applicator tool which is described and claimed in European Patent Specification Ser. No. 0138570. Essentially the applicator comprises a body 10 and a lever 11 which are coupled together for the lever to be pivotal about a pivot 12. Spring means 19 keeps the lever 11 away from the handle 13 of body 10 when the applicator tool in its normal rest position as shown in FIGS. 1 and 4.

As described in European patent specification No. 0138570 coupling means couple the lever 11 to a movable element 17 within the body 10. The coupling means can comprise a link (not shown) which links the lever 11 to a toothed quadrant 35. The toothed quadrant 35 engages with the toothed rack 36 of the movable element 17. Quadrant 35 rotates about a pivot axis indicated at 37. An applicator member 16 is carried by the moVable element 17. As lever 11 is moved toward handle 13 the movable element 17 moves to push the applicator member 16 rectilinearly toward the tag T as will hereinafter be described.

Supported by body 10 is an anvil 14 with incorporates a housing 15 for the applicator member 16 and a recess 18 in which the ear of an animal can be located for application of a tag.

The applicator member 16 is coupled at one end to the driving member 17 within the body and is formed at the other end as a leading end 21 which in operation is driven through the animal's ear to form an opening therein. Preferably the leading end 21 is so shaped as to provide a clean opening and thus is preferably in the form of a hollow cylinder having a leading edge formed by an inclined profile with the extreme end being lowermost as shown in FIGS. 1 and 4.

In use of the applicator tool the animal's ear is located within recess 18 and by drawing the lever 11 toward handle 13 the applicator member 16 is forced through the animal's ear by cutting an opening in the ear. At the extent of its travel a leading end 29 of an ear tag T (which is supported in the magazine as hereinafter described) engages within the recess R formed by the inclined profile in the open end of the applicator member 16. As relative movement between the applicator and the animal's ear takes place the part of the tag which is engaged with the applicator member 16 is drawn by the applicator member through the opening in the animal's ear.

Figure 3:
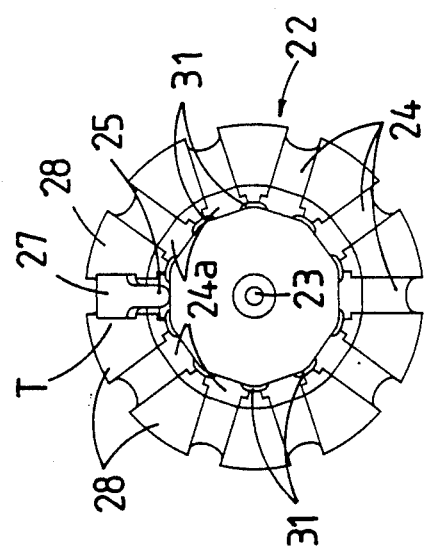
FIG. 3 is an end view of the magazine.

According to the present invention a magazine 22 is mounted for rotation about an axle 23 said axle extending upwardly and forwardly from the anvil 14. Located about the periphery of the magazine 22 are a plurality of tag receiving cavities 24. In FIG. 1 of the drawings a tag T is shown located in a cavity 24 which has been positioned in the location at which, during operation of the applicator, the tag will be installed in an animal's ear. The tag as illustrated is of the Allflex FLOCK TAG (T.M.) type and comprises a first leg 26 which locates within the cavity 24 and joined by an intermediate or curved portion 25 to a second leg 27 which is located outside the cavity. As can be seen from FIG. 3 the cavity 24 includes a slotted portion 24a into which the first leg 26 of the tag is slidingly located. The extent of movement into the cavity is restricted by a suitable partition or wall portion 24b within the cavity (as best seen in FIG. 4).

Preferably small protrusions 31 are located adjacent each side of the entry to the slot 24a of each cavity 24. The purpose of these protrusions 31 is to provide an interference with the first leg 26 of tag T for resistance against movement of the tag thereby ensuring, during application, the tag becomes fully seated in the animal's ear.

The external periphery of the magazine 22 is formed with ramp portions 28 located between the cavities 24. As shown in FIG. 1 the leading end 29 of leg 27 of the tag T is presented in the appropriate location bY the ramp portions 28 flanking each cavity 24. The leading portion 29 of the tag is thus aligned with the recess 18 in the anvil 14.

Accordingly when the applicator tool has been closed, i.e. the lever moved toward handle 13, the leading end 29 of the tag T becomes engaged with the recess R in the applicator member 16 (as previously described) so that as relative movement between the applicator and the animal's ear takes place (to draw the applicator member back through the opening in the animal's ear) the leading end 29 and hence second leg 27 of the tag is drawn through the animal's ear so that the curved intermediate portion 25 locates within the opening.

As shown in FIG. 4 the mouth 32 of the housing 15 in which applicator member 16 slides is upwardly enlarged (shown at 33). The applicator member 16 is pivotally attached, by pivot pin 34, to the driving member 17 so that as the applicator member moves outwardly a point is reached (which corresponds with the applicator member engaging the tag T) where the applicator member can pivot about pivot pin 34 (as shown in FIG. 4) during the relative movement apart of applicator and animal's ear. Following application of the tag the operator merely indexes, i.e. rotates the magazine 22 so that the tag in the next available cavity becomes aligned with recess 18. To provide positive indexing a spherical member (not shown), which is spring loaded is located within the anvil 14 or magazine 22 and engages in a shallow curved recess in the opposite surface of the magazine 22 or anvil 14 respectively.

The applicator is open to modification. For example it is possible to provide an automatic indexing mechanism which automatically rotates the magazine to the extent of one cavity each time lever 11 is returned to the open position. Another modification is to provide a quick release mounting of the magazine on the axle 23 rather than a nut, such that once all cavities have been emptied of tags the operator could merely remove the empty magazine and place on the axle 23 a preloaded magazine.

One means of achieving indexing is to provide a pawl which indexes the magazine 36° (for a 10 tag magazine). This pawl can be operated by squeezing the lever 11 such that as the applicator member 16 penetrates the animal's ear the magazine 22 simultaneously revolves so that a tag is positioned ready to apply as soon as the applicator member is fully through the ear.

To achieve quick release a mechanism of the type commonly found on most modern fishing reels can be employed. A button can be located on the front of the magazine 22 which when depressed would collapse fingers which locate in a groove in the magazine axle. This permits the magazine to be slid forward off the axle and a fresh/loaded magazine to be slid on and check into place.

By provision of the rotatable magazine an applicator tool is formed whereby a quantity of tags can be preloaded so that loading of tags between each tagging operation is not required. The magazine is of simple construction thus reliable in operation and is not of such dimensions and shape as to cause bulkiness to the applicator not indeed imbalance of the applicator due to the weight of the magazine and tags.

What is claimed is:

1. An applicator tool for applying identification tags to animals, the applicator tool comprising a movable applicator member, lever means coupled to said applicator member, a magazine having a plurality of separate tag receiving means into each of which at least part of a tag can be located, said magazine being mounted on the applicator such that it can be indexed to place a tag located therein into a position whereby the applicator member can engage, upon movement of the applicator member by said lever means that part of the tag to be moved through an opening in the portion of the animal to which the tag is to be applied and cause said part of the tag to become installed through said opening;

wherein the applicator member is movable such that is forms said opening and then engages with the tag part so that the tag part during relative movement between the applicator member and the animal can be caused to move through the opening as the applicator member is retracted from the opening.

2. An applicator tool as claimed in claim 1 wherein the magazine is generally cylindrical and is mounted for rotation about a central axis of symmetry.

3. An applicator tool as claimed in claim 2 wherein said plurality of tag receiving means are located at or near the periphery of the magazine said cavities being suitably shaped to accommodate said at least part of a tag.

4. An applicator tool as claimed in claim 2 or 3 further including indexing means which rotates the magazine in response to movement of said lever.

5. An applicator tool as claimed in claim 3 wherein the magazine is removable.

6. An applicator tool as claimed in claim 2 wherein the tool comprises a body having a lever pivotally mounted therewith, said magazine being mounted to the body via an anvil, the applicator member being drivingly coupled to said lever to thereby be movable rectilinearly toward a cavity in said magazine.

7. An applicator tool as claimed in claim 6 wherein said applicator member is pivotally coupled to a driven member, said driven member being movable by said lever, the applicator member being slidingly engaged in a guide, said guide including means which permits pivotal movement of said applicator member to take place once a predetermined movement of said applicator member toward the cavity has occurred.

8. An applicator tool as claimed in claim 2, 6, or 7 wherein each cavity comprises an open ended slot into which a first portion of a one piece animal ear tag can be slid, there being means for locating said tag in said slot and presenting a second portion of said tag to said applicator member.

9. An applicator tool as claimed in claim 2, 6 or 7, wherein each cavity comprises an open ended slot into which a first portion of a one piece animal ear tag can be slid, there being means for locating said tag in said slot and presenting a second portion of said tag to said applicator member said presenting means being formed by ramps located externally of and adjacent each side of said slot.

* * * * *